United States Patent [19]

Patterson et al.

[11] 4,328,988
[45] May 11, 1982

[54] DROPSIDE PICKUP

[75] Inventors: Albert E. Patterson, Greenfield, Ind.; Timothy C. Pollard, West Bloomfield, Mich.

[73] Assignee: C. E. Pollard Company

[21] Appl. No.: 176,141

[22] Filed: Aug. 7, 1980

[51] Int. Cl.³ ............................................. B60P 9/00
[52] U.S. Cl. ...................................... 296/10; 296/183
[58] Field of Search .................. 296/10, 14, 36, 57 R, 296/183

[56] References Cited

U.S. PATENT DOCUMENTS

| Re. 23,848 | 7/1954 | Gerhardt | 296/183 |
|---|---|---|---|
| 2,145,926 | 2/1939 | Gooder | 296/10 |
| 2,772,913 | 12/1956 | Holan et al. | 296/183 |
| 3,068,038 | 12/1962 | Douglass, Jr. | 296/183 |
| 3,103,380 | 9/1963 | Berger et al. | 296/183 |

FOREIGN PATENT DOCUMENTS 955412 4/1964 United Kingdom .................. 296/10

OTHER PUBLICATIONS

Photograph of Azuzu truck (prior to 1979).
Perfection Combination Bodies Series 100, 200 and 300 (prior to 1979).

*Primary Examiner*—Richard A. Bertsch
*Assistant Examiner*—Ross Weaver
*Attorney, Agent, or Firm*—Harness, Dickey & Pierce

[57] ABSTRACT

A bed for a pickup truck having side gates in the sidewalls thereof and a tailgate in the rear wall thereof having exterior contours identical to the exterior contours of the wall within which the gates are located, to provide increased accessibility to the interior of the bed and an aesthetically appealing design. The gates are supported to provide strength to resist against loads disposed in the bed that may be forced against the gate by having support members secured thereto on the inboard side of the gate along with the gate having a strength contour along its inboard side. The bed also has a low profile yet having support for heavy loads by having the floor joists separated, having inboard joists secured to the chassis of the vehicle and outboard joists secured to the bed below the floor of the bed.

9 Claims, 4 Drawing Figures

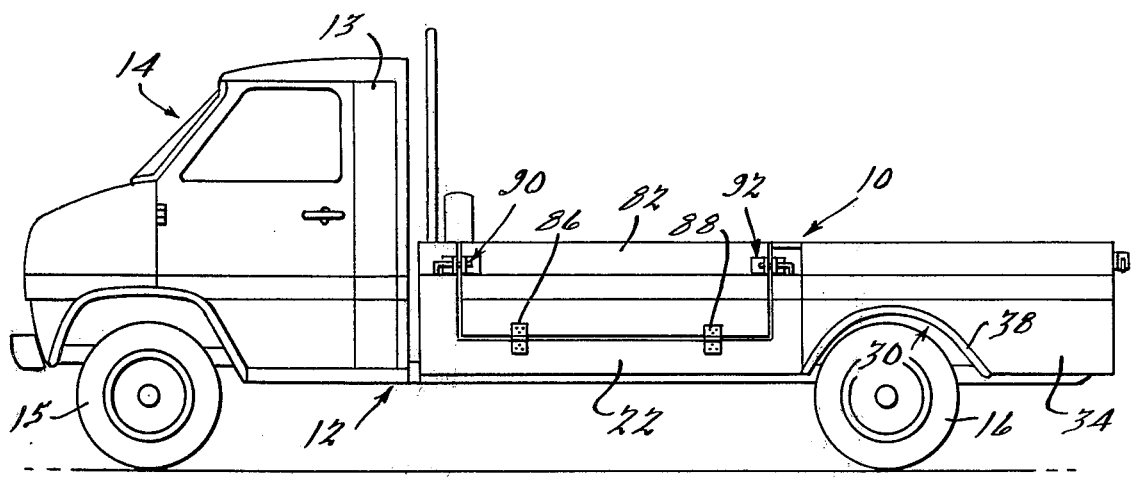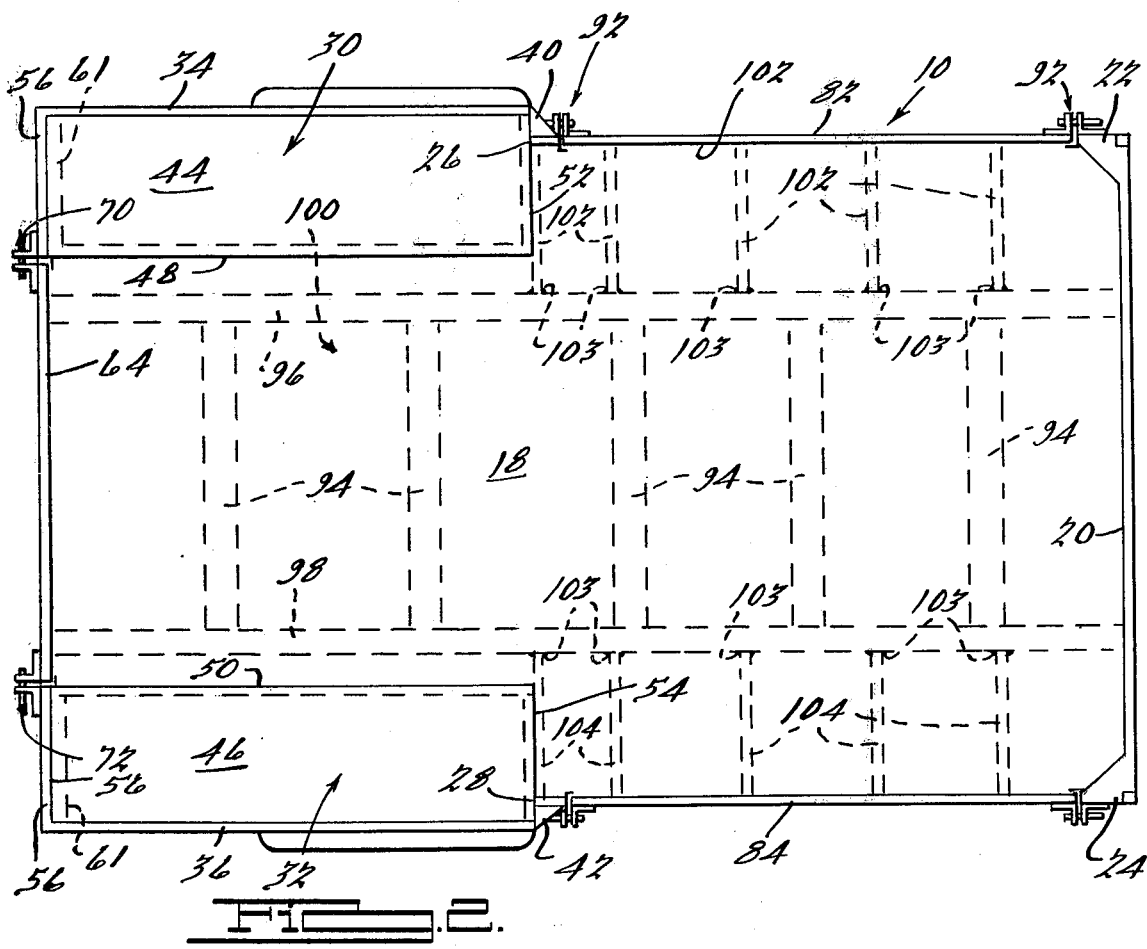

DROPSIDE PICKUP

BACKGROUND AND SUMMARY OF THE INVENTION

The present invention relates generally to pickup trucks and beds for pickup trucks, and more particularly to pickup truck beds for downsized, light chassis pickup trucks that will be soon marketed in response to the need for a light duty vehicle having the capabilities of a pickup truck yet having efficient fuel economy to be relatively economical in times of high fuel cost. The dropside pickup bed of the present invention utilizes a rear tailgate as in conventional pickup trucks, but also includes dropside gates on both sides of the bed forward of the rear wheel wells to provide greater access to the bed of the pickup truck. The present bed construction also provides a lower access, i.e. sits lower on the chassis of the truck, to require less force to lift a load either manually or mechanically into the truck, since the load will not have to be lifted as high. An additional feature is that inboard and outboard supports are provided underneath the bed to permit it to carry a much higher load than an unsupported structure would be capable in combination with the above-mentioned low profile, increased access construction.

The above features are also provided in a design wherein the outboard surfaces of the gates of the pickup truck are contoured to blend in with the outboard surface contours of the truck. The inboard sides of the preferred embodiment are substantially straight to provide optimum strength for the gates when in a closed position and support members are secured to the gate along its inboard side to provide strength to resist against loads disposed in the bed that may be forced against the gate. The gates are also situated so that when dropped or opened, the access may be wide enough to permit a conventional sized pallet to be placed onto the truck through the gate by a fork lift truck or the like. Thus, the dropside pickup bed of the present invention provides a durable, aesthetically appealing, lightweight, relatively inexpensive bed for a pickup truck having numerous features which are desirable to those in the art who utilize pickup trucks in commerce.

Other objects and advantages of the instant invention will be apparent from the following specification, claims and drawings.

BRIEF DESCRIPTION OF THE DRAWINGS

FIG. 1 is a side elevational view of a pickup truck utilizing the dropside pickup truck bed of the present invention;

FIG. 2 is a top view of the bed of the present invention;

DESCRIPTION OF THE PREFERRED EMBODIMENT

Figure 3:
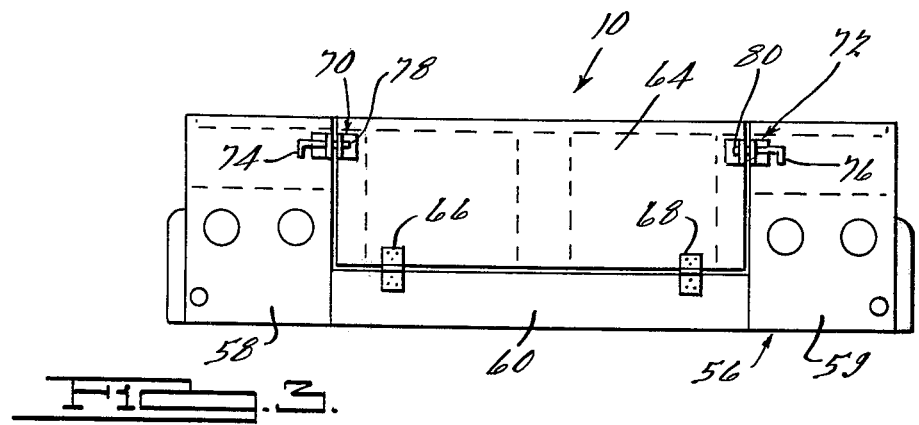
FIG. 3 is a rear view of the bed of the present invention.

Referring to FIG. 1, the bed 10 of the present invention is illustrated mounted on a light duty pickup truck chassis 12, designated the Chevrolet Cutaway Van Chassis, and manufactured by the General Motors Corporation. The bed extends from a position just behind the cab 13 of the vehicle 14 to a rearward position extending beyond the rear wheel 16 of the vehicle. As shown in FIG. 2, the pickup truck bed 10 has a floor 18 from which a front wall panel 20 extends upwardly. Sidewalls 22 and 24 extend rearwardly from said front wall 20 to a midpoint 26, 28 of the bed 10. The floor 18 is a cutaway from the midpoint 26, 28 of the bed 10 to permit wheel wells 30, 32 to be mounted on the structure. Sidewalls 34, 36 are provided as the outboard wall of the wheel wells 30, 32, with said sidewalls 34, 36 each having a cutaway portion, as designated by the numeral 38 (FIG. 1) for sidewall 34, for mounting of the rear wheels 16. Connecting walls 40, 42 are welded between the sidewalls 22, 24 and the wheel well sidewalls 34, 36, respectively, to provide additional structural support at the midpoint for all of the sidewalls. Decks 44 and 46 are provided as the top of the wheel wells 30, 32 inboard of the wheel well sidewalls 34, 36. Inner sidewalls 48 and 50 are secured between the decks 44 and 46 and the floor 18 and inner panels 52 and 54 are secured between the forward portion of the decks 44 and 46 and the floor 18 to form the forward and inboard portions of the wheel wells. A rear wall 56 (FIG. 3) extends across the rear of the truck bed 10 to complete the wheel well. In FIG. 3 the rear wall 56 is shown as three components welded together, comprising outer walls 58 and 59 and intermediate wall 60. It is noted as conventional in the art, however, to provide this rear wall 56 as a single part or other variation thereof. Tail light shields 61 are welded to the interior of each of the wheel wells 30, 32 to protect the tail lights and circuitry therefor from damage.

A rear tailgate 64 is provided in the rear wall panel 56. The gate is hinged by means of two hinges 66 and 68 and is provided with locking means in the form of Cleveland stake rack latches 70 and 72, each having a handle 74, 76 which can be rotated upwardly and pulled out axially to each disengage the respective latch mechanism 70 or 72 and permit the gate 64 to drop. Alternatively, when the gate is in the up position, the handles 74, 76 can be pushed into the keyed mechanisms 78, 80, pushed down, and the gate 64 will be locked in an up position within the contours of the rear panel 56 of the bed 10.

Side gates 82 and 84 are set in side panels 22 and 24, respectively, between the front 15 and rear 16 wheels of the vehicle and, of course, behind the cab 13 of the vehicle 14. The side gates 82 and 84 are designed to be within the contour of the bed 10 when in an up, closed position. Referring to FIG. 1, the side gate 82 is hinged by two hinge mechanisms 86 and 88 secured to the sidewall 22. Latch mechanisms 90 and 92 are identical to those described with respect to the rear gate 74 as designated 70 and 72, and the description will not be repeated here. Side gate 84 has the identical latch and hinge mechanisms that are provided for side gate 82 and is the mirror-image of side gate 82 placed within the recess of sidewall 24.

Figure 4:
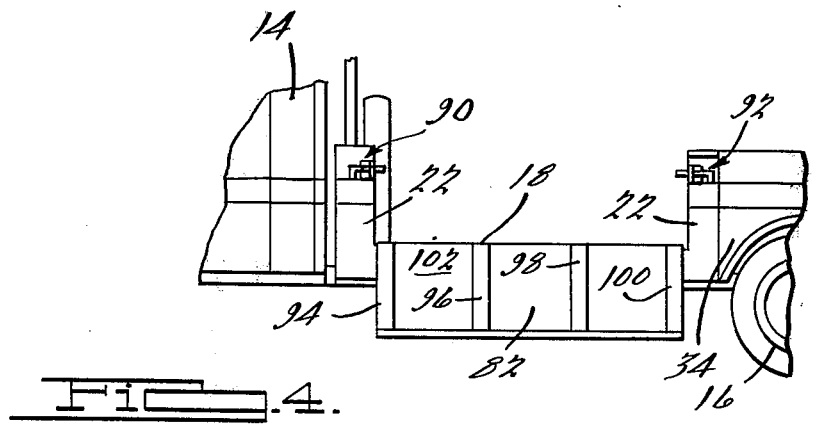
FIG. 4 is an elevated side view of a portion of the bed of the present invention illustrating the dropside gate in a lowered position.

FIG. 4 illustrates one side gate 82 in the unlatched, down position. Also in FIG. 4, the support members 94, 96, 98, and 100 are illustrated which are provided to give the gate 82 added strength when in the upward latched position of FIG. 1 to resist against loads disposed in said bed that may be forced against the gate 82. The support members are common to all three of the gates 64, 82, and 84, except that the rear tailgate 64 in the preferred embodiment is shorter than the side gates 82 and 84 and only has three support members instead of four. The support members 94, 96, 98, and 100 are attached to the inboard side 102 (FIG. 2) of the gate 82 to permit the outboard side 104 (FIG. 2) to be contoured consistently with the desired design of the sidewall 22 of the bed 10.

Since the pickup truck and bed are designed to carry a 5000 pound pay load, a unique support system was invented as part of the present invention, which also permits the advantage of a much lower profile for the bed on the truck and, due to the lower profile, easier access for any goods that must be lifted into the truck bed 10. Inboard supports or joists 106 are welded at set distances between the side members 108 and 110 of the chassis 12 of the vehicle 14. Outboard support members or joists 112 and 114, however, are secured by welding or the like to the lower portion of the floor panel 18 of the bed 10. This construction of the bed 10 permits the bed to be prefabricated and then placed on the finished chassis at any time. Also, the outboard supports 112 and 114 provide added support at the side entrances of the bed 10 outboard of the chassis 12 where no support generally exists in pickup trucks of this type. Assembly problems are also diminished by this construction since the chassis 12 can be manufactured in one facility and the bed 10 in another facility with very minimal required time or effort to affix the bed 10 to the chassis 12, including welding the inboard ends 103 of the outboard joists 102 to the chassis (FIG. 2).

The above description and drawings disclose embodiments of the invention which fully and effectively accomplish the objects thereof. However, it will be apparent that variations in the details of the apparatus may be indulged in without departing from the sphere of the invention herein described, or the scope of the appended claims.

What is claimed is:

1. A bed for a pickup truck, comprising
a floor and front, rear, and two sidewalls mounted to said floor and having portions extending upwardly from the periphery of said floor, said walls having smooth surfaces exterior of the bed, the cross-section of each of said walls forming a smooth contour along said exterior surface thereof, at least one of said sidewalls having a recess therein;
hinge means attached to said sidewall at said recess;
at least one gate attached by said hinge means to said sidewall, within said recess, having a smooth exterior surface, the cross-section of said gate having a contour matching the portion of said sidewall adjacent said recess, latch means for securing said gate to said sidewall in a latched position wherein said gate contour and the contour of said sidewall adjacent said recess match when said latch means secures said gate to said sidewall;
a chassis for said pickup truck, said chassis having a set of front wheels and a set of rear wheels; and
means for mounting said bed on said chassis, wherein when said bed is mounted on said chassis, said recess in said sidewall is located between said set of front wheels and said set of rear wheels;
wherein said bed has joist means for supporting loads on said floor, said joist means comprising
inboard joists secured to said chassis, and outboard joists secured to said bed below said floor; and
wherein the floor of said bed is disposed in a horizontal plane below the horizontal line formed by the top portions of said rear wheels.

2. A claim in accordance with claim 1, wherein the length of said recess is greater than the width of a conventional pallet.

3. A claim in accordance with claim 1, wherein both sidewalls have said hinge means, latch means, recess and gate having a matching exterior contour.

4. A claim in accordance with claim 3, wherein said rear wall of said bed has an exterior contour and said bed includes hinge means, latch means attached to said rear wall, a recess in said rear wall and a gate attached to said rear wall by said hinge means, said gate having an exterior contour matching said exterior contour of said rear wall.

5. A claim in accordance with claim 1, wherein said gate has support means to resist against loads forced against said gate, said support means being located along the side of the gate facing into the bed when said gate is in said latched position.

6. A claim in accordance with claim 5, wherein the side of the gate facing into the bed when said gate is in said latched position has a straight cross-sectional contour.

7. A claim in accordance with claim 1, wherein said joists are secured to said chassis and said bed to permit said bed to be positioned on said chassis to provide a low profile and position said floor in a relatively low vertical position.

8. A claim in accordance with claim 1, wherein said recess extends vertically from said floor to the top of said sidewall.

9. A claim in accordance with claim 1, further comprising wheel wells attached to said bed, said sidewalls comprising a side wheel well wall and a forward sidewall, said recess being disposed in said forward sidewall.

* * * * *